United States Patent
Krithivas et al.

(10) Patent No.: US 11,294,749 B2
(45) Date of Patent: Apr. 5, 2022

(54) TECHNIQUES TO COLLECT CRASH DATA FOR A COMPUTING SYSTEM

(71) Applicant: Intel Corporation, Santa Clara, CA (US)

(72) Inventors: Ramamurthy Krithivas, Chandler, AZ (US); Anand K. Enamandram, Folsom, CA (US); Eswaramoorthi Nallusamy, Cedar Park, TX (US); Russell J. Wunderlich, Livermore, CO (US); Krishnakanth V. Sistla, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 938 days.

(21) Appl. No.: 15/859,474

(22) Filed: Dec. 30, 2017

(65) Prior Publication Data
US 2019/0042348 A1    Feb. 7, 2019

(51) Int. Cl.
*G06F 11/07*    (2006.01)

(52) U.S. Cl.
CPC ........ *G06F 11/0778* (2013.01); *G06F 11/079* (2013.01); *G06F 11/0721* (2013.01); *G06F 11/0751* (2013.01); *G06F 11/0784* (2013.01); *G06F 11/0793* (2013.01)

(58) Field of Classification Search
CPC ............. G06F 11/0778; G06F 11/0784; G06F 11/0721; G06F 11/0793; G06F 11/079; G06F 11/0751

USPC .......................................................... 714/37
See application file for complete search history.

(56) References Cited

U.S. PATENT DOCUMENTS

| | | | | |
|---|---|---|---|---|
| 2002/0178416 | A1* | 11/2002 | Chen | G06F 11/27 714/733 |
| 2003/0079156 | A1* | 4/2003 | Sicola | H04L 69/40 714/4.1 |
| 2012/0173922 | A1* | 7/2012 | Cheng | G06F 11/2025 714/13 |

OTHER PUBLICATIONS

Wikipedia IPMI page from date Dec. 21, 2017m retrieved using the Way Back Machine, form https://web.archive.org/web/20171221070103/https://en.wikipedia.org/wiki/Intelligent_Platform_Management_Interface (Year: 2017).*
Wikipedia IOOBMpage from date Dec. 1, 2017m retrieved using the Way Back Machine, from https://web.archive.org/web/20171201184746/https://en.Wikipedia.org/wiki/Out-of-band_management#IMPLEMENTATION (Year: 2017).*

* cited by examiner

*Primary Examiner* — Yair Leibovich
(74) *Attorney, Agent, or Firm* — Compass IP Law PC

(57) ABSTRACT

Examples include techniques to collect crash data for a computing system following a catastrophic error. Examples include a management controller gathering error information from components of a computing system that includes a central processing unit (CPU) coupled with one or more companion dice following the catastrophic error. The management controller to gather the error information via a communication link coupled between the management controller, the CPU and the one or more companion dice.

23 Claims, 11 Drawing Sheets

*600*

RECEIVE, AT A MANAGEMENT CONTROLLER, AN INDICATION OF A CATASTROPHIC ERROR FOR A COMPUTING SYSTEM THAT INCLUDES A CPU COUPLED WITH ONE OR MORE COMPANION DICE
*602*

SEND A REQUEST TO GATHER ERROR INFORMATION FROM THE CPU AND FROM THE ONE OR MORE COMPANION DICE RESPONSIVE TO THE INDICATION OF THE CATASTROPHIC ERROR, THE REQUEST SENT VIA A COMMUNICATION LINK COUPLED TO THE MANAGEMENT CONTROLLER AND SEPARATELY COUPLED TO THE CPU AND SEPARATELY COUPLED TO EACH OF THE ONE OR MORE COMPANION DICE
*604*

SEPARATELY RECEIVE ERROR INFORMATION FROM THE CPU AND FROM EACH OF THE ONE OR MORE COMPANION DICE VIA THE COMMUNICATION LINK
*606*

600

602
RECEIVE, AT A MANAGEMENT CONTROLLER, AN INDICATION OF A CATASTROPHIC ERROR FOR A COMPUTING SYSTEM THAT INCLUDES A CPU COUPLED WITH ONE OR MORE COMPANION DICE

604
SEND A REQUEST TO GATHER ERROR INFORMATION FROM THE CPU AND FROM THE ONE OR MORE COMPANION DICE RESPONSIVE TO THE INDICATION OF THE CATASTROPHIC ERROR, THE REQUEST SENT VIA A COMMUNICATION LINK COUPLED TO THE MANAGEMENT CONTROLLER AND SEPARATELY COUPLED TO THE CPU AND SEPARATELY COUPLED TO EACH OF THE ONE OR MORE COMPANION DICE

606
SEPARATELY RECEIVE ERROR INFORMATION FROM THE CPU AND FROM EACH OF THE ONE OR MORE COMPANION DICE VIA THE COMMUNICATION LINK

FIG. 6

Storage Medium 700

*Computer Executable Instructions for 600*

RECEIVE, AT A STATE MACHINE, A REQUEST TO GATHER ERROR INFORMATION GENERATED BY ONE OR MORE IP BLOCKS RESPONSIVE TO A CATASTROPHIC ERROR FOR A COMPUTING SYSTEM INCLUDING A CENTRAL PROCESSING UNIT (CPU) COUPLED WITH ONE OR MORE COMPANION DICE, THE REQUEST RECEIVED VIA A COMMUNICATION LINK COUPLED WITH A MANAGEMENT CONTROLLER FOR THE COMPUTING SYSTEM
902

OBTAIN THE ERROR INFORMATION GENERATED BY THE ONE OR MORE IP BLOCKS
904

SEND THE ERROR INFORMATION GENERATED BY THE ONE OR MORE IP BLOCKS TO THE MANAGEMENT CONTROLLER VIA THE COMMUNICATION LINK
906

*FIG. 9*

*Storage Medium 1000*

*Computer Executable Instructions for 800*

*FIG. 10*

TECHNIQUES TO COLLECT CRASH DATA FOR A COMPUTING SYSTEM

TECHNICAL FIELD

Examples described herein are generally related collecting crash data from processing elements of a computing system.

BACKGROUND

Computing platforms or systems such as server platforms may include management controllers to gather crash data from various hardware components following a catastrophic error of a central processing unit (CPU). The various hardware components may include CPU core intellectual property (IP) blocks, CPU uncore IP blocks, or IP blocks of companion dice coupled with the CPU. IP blocks of companion dice may be coupled with the CPU either integrated on a same circuit board or package as the CPU ("integrated companion dice") or discrete chips outside of the circuit board or package housing the CPU ("discrete companion die"). An example of a management controller that gathers crash data information may be a baseboard management controller (BMC).

In some examples, a BMC for a computing platform may perform a type of crash data harvesting known as a crash dump following a catastrophic error of a CPU. A crash dump may be a version of crash data harvesting that harvests crash data from only CPU core/uncore IP blocks. Another type of crash data harvesting may involve pulling crash data from crash logs maintained at CPU core/uncore IP blocks and IP blocks of companion dice. These crash logs may indicate error or state information of these hardware components when the CPU encountered the catastrophic error. The error or state information may be used to debug a computing platform to avoid subsequent catastrophic errors of the CPU.

BRIEF DESCRIPTION OF THE DRAWINGS

FIG. 6 illustrates an example of a first logic flow.
FIG. 7 illustrates an example of a first storage medium.
FIG. 9 illustrates an example of a second logic flow.
FIG. 10 illustrates an example of a second storage medium.

DETAILED DESCRIPTION

Figure 1:
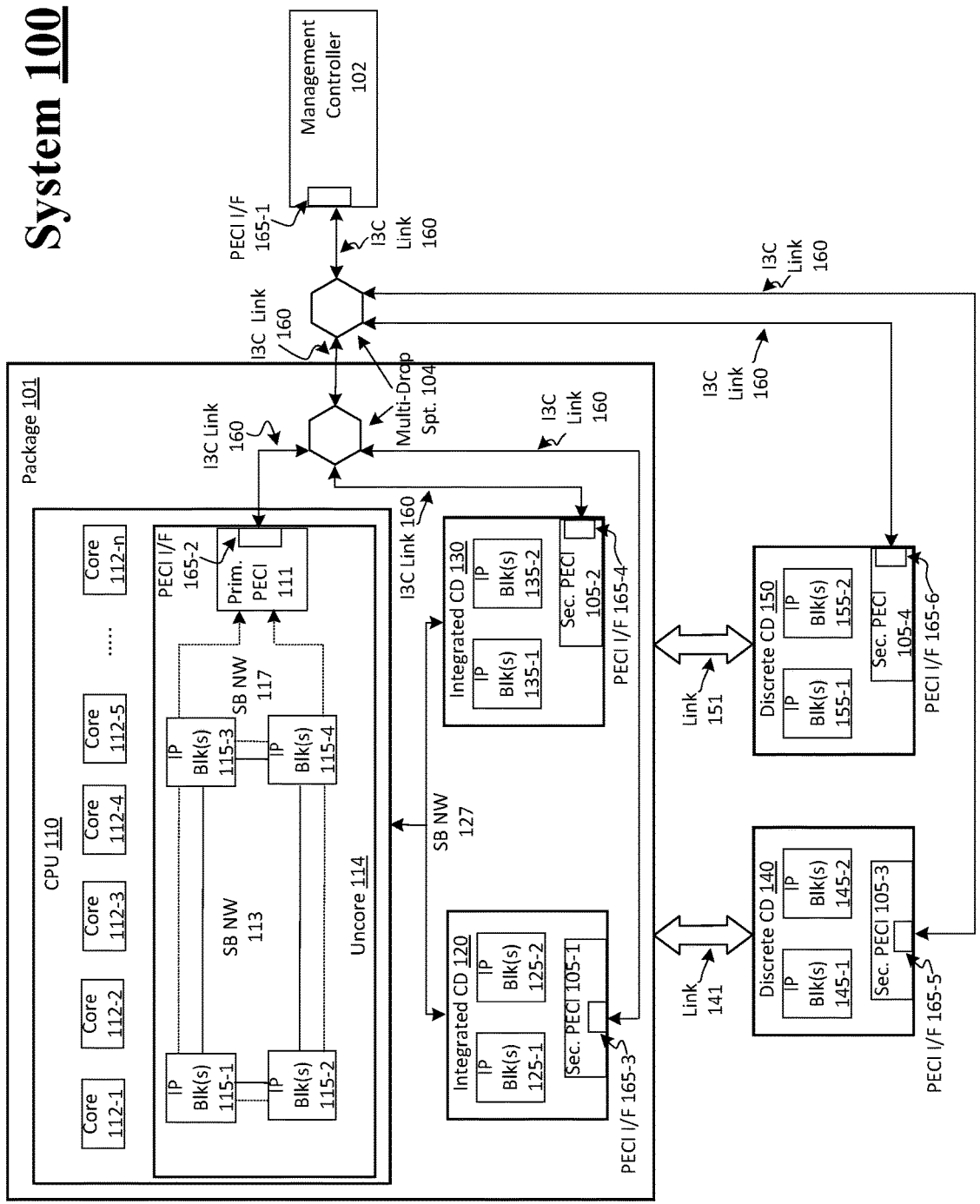
FIG. 1 illustrates an example system.

As contemplated in the present disclosure, crash data harvesting may include a management controller of a computing platform or system, such as a BMC, pulling or obtaining crash data from crash logs following a catastrophic error of a CPU hosted by the computing platform. For example, a CPU may encounter a catastrophic error such as a three-strike timeout. A three-strike timeout catastrophic error may be signaled via a type of signal such as a CATERR/IERR signal. IP blocks of companion dice coupled with the CPU may store error information associated with a catastrophic error in "sticky" registers. These sticky registers may be arranged to preserve the stored error information during or following warm resets to enable the BMC to harvest or gather the error information from the IP blocks of companion dice for debugging purposes. A warm reset typically results in maintaining stored error information in these sticky registers versus resetting registers to default values following a cold reset.

In some computing platforms, BMCs may pull crash data from a CPU package through a package level interface such as a Platform Environment Control Interface (PECI) routed through a single wire. According to some examples, a PECI protocol state machine (e.g., a register transfer level (RTL) block) may be included on the CPU package to interface with the BMC to enable the BMC to pull crash data from hardware components of the CPU package. For computing platforms using server CPUs such as those from, but not limited to, Intel® Corporation, the PECI protocol state machine may be an out-of-band multi-server manager (OOB-MSM).

In some examples, the PECI protocol state machine (e.g. arranged as an OOB-MSM) may be capable of accessing CPU core/uncore IP blocks and IP blocks of integrated companion dice via one or more internal (e.g., within the CPU package) sideband networks. These one or more internal sideband networks may include, but are not limited to, an integrated on-chip system fabric (IOSF) or a general purpose/power management sideband network. Though an internal sideband network may be more robust than types of internal highspeed networks or interconnects such as, but not limited to, those operated according to the Quick Path Interconnect (QPI) specification, a failure of the internal sideband network may deny the PECI protocol state machine access to sticky registers on the CPU package that maintain crash data. The PECI protocol state machine may also be capable of accessing IP blocks of discrete companion dice via external highspeed paths such as, but not limited to, a Keizer Technology Interconnect (KTI), a Direct Media Interface (DMI) or an Intel accelerator link. However, failure in external highspeed paths (a possible trigger of a catastrophic crash) may also deny the PECI protocol state machine access to sticky registers that maintain crash data for IP blocks of discrete companion dice.

According to some examples, the PECI protocol state machine being unable to access crash data from CPU core/uncore IP blocks, IP blocks of integrated dice or IP blocks of discrete dice may cause the BMC or management controller to issue a special warm reset. This special warm reset may not rely on completion of various reset handshakes between the CPU and a platform controller hub that may occur with a typical warm reset. This special warm reset is typically called a demoted warm reset (DWR). A DWR does not guarantee that the BMC will still be able to access crash data through the PECI protocol state machine. Also, the BMC may need to issue a cold reset to recover the computing platform from an error condition. The cold reset may cause sticky registers holding crash data for IP blocks to return to default values and may result in a complete loss of crash data. Also, if the PECI protocol state machine is an OOB-MSM, firmware components of the OOB-MSM (e.g., power control unit firmware) may fail due to the catastrophic error and this may block the BMC from obtaining crash data through the OOB-MSM. Further, DWR may take around 30 seconds per CPU to complete and computing platforms having multiple CPUs may result in the BMC taking several minutes to harvest crash data when implementing DWR. It is with respect to these challenges that the examples described herein are needed.

FIG. 1 illustrates an example system 100. In some examples, system 100 may be part of a computing platform or system that, as shown in FIG. 1, may include a package 101, a management controller 102, a CPU 110, integrated companion dice (CD) 120, integrated CD 130, discrete CD 140 and discrete CD 150. For these examples, also as shown in FIG. 1, management controller 102 may couple to CPU 110, integrated CDs 120/130 and discrete CDs 150/160 over an I3C link 160. As described more below, management controller 102, CPU 110, integrated CDs 120/130 or discrete CDs 150/160 may include respective PECI interfaces (I/Fs) 165-1 to 165-6 and respective logic and/or features to send or receive PECI commands over I3C link 160 in order to push or pull crash data from IP blocks located at CPU 110, integrated CDs 120/130 or discrete CDs 150/160. I3C link 160 may be configured as a two-wire communication link and the logic and/or features to send or receive PECI commands through PECI I/Fs may operate in compliance with one or more industry specifications such as, but not limited to, an industry specification developed by the Mobile Industry Processor Interface (MIPI) Alliance Sensor Working Group known as the MIPI I3C specification, version 1.0, published in December 2016 ("the I3C specification").

In some examples, as shown in FIG. 1, package 101 may include a CPU 110 having cores 112-1 to 112-n, where "n" may represent any whole, positive integer greater than 5. CPU 110 may also include an uncore 114 having IP block(s) 115-1 to 115-4. IP blk(s) 115-1 to 115-4 may be coupled together via a sideband network (SB NW) 113. SB NW 113, in some examples, may be an internal SB NW such as, but not limited to, an integrated on-chip system fabric (IOSF) SB NW. IP block(s) 115-1 to 115-4 may separately include one or more programmable blocks or modules of logic such as one or more field programmable gate arrays (FPGAs) or application specific integrated circuits (ASICs) arranged to support cores 112-1 to 112-n. For example, support that may include such functions as, but not limited to, serving as a QPI controller, an on-die memory controller, L3 cache or a snoop agent pipeline.

According to some examples, uncore 114 may also include a primary PECI 111. For these examples, primary PECI 111 may include a PECI protocol state machine to implement all or most PECI protocols. For example, in additional to implementing PECI protocols to gather or collect crash data from IP block(s) 115-1 to 115-4, primary PECI 111 may also collect thermal management data from thermal sensors located on CPU 110 (not shown) and then provide or send collected data to management controller 102 through PECI I/F 165-2 over an I3C link 160. For computing platforms using server CPUs such as those from, but not limited to, Intel® Corporation, primary PECI 111 may function as part of an OOB-MSM to provide or send CPU related data to management controller 102 through PECI I/F 165-2 over the I3C link 160.

In some examples, primary PECI 111 may couple to IP blocks 115-1 to 115-4 via SB NW 117. For these examples, SB NW 117 is shown as dashed-lines in FIG. 1 to differentiate SB NW 117 from SN NW 113. SB NW 117 may be arranged as a general purpose/power management SB NW. In some examples, primary PECI 111 may obtain crash data via SB NW 117 from IP block(s) 115-1 to 115-4 responsive to a PECI command received from management controller 102.

According to some examples, as shown in FIG. 1, package 101 may include a CPU 110 coupled with two integrated CDs 120 and 130 via an SB NW 127. Examples are not limited to two integrated CDs on a package such as package 101, any number of integrated CDs are contemplated. For these examples, SB NW 127 may be either an extension of SB NW 113 (e.g., part of an IOSF SB NW) or an extension of SB NW 117 (e.g., part of a general purpose/power management SB NW). As described more below, rather than sending crash data through one or more internal SB NWs and through primary PECI 111 responsive to a PECI command received from management controller 102, management controller 102 may be able to obtain crash data from IP blocks at integrated CD 120 or integrated CD 130 through PECI I/F 165-1 coupled with I3C link 160 coupled with I3C link 160 that is coupled to these integrated CDs through respective PECI I/Fs 165-3 and 165-4.

In some examples, as shown in FIG. 1, discrete CD 140 and discrete CD 150 may couple to package 101 via respective links 141 and 151. Links 141/151 may include external highspeed paths coupling with elements of package 101 such as CPU 110 or integrated CD 120 or integrated CD 130. Links 141/151 may include external highspeed paths such as, but not limited to, a KTI, DMI or an Intel accelerator link highspeed paths. As described more below, rather than sending crash data through, external highspeed paths, then through one or more internal SB NWs and then through primary PECI 111 responsive to a command received from management controller 102, management controller 102 may be able to obtain crash data from IP blocks at discrete CD 140 or discrete CD 150 through PECI I/F 165-1 coupled with I3C link 160 that is coupled to these discrete CDs through respective PECI I/Fs 165-5 and 165-6.

According to some examples, as shown in FIG. 1, integrated CD 120, integrated CD 130, discrete CD 140 and discrete CD 150 may respectively include secondary PECIs 105-1 to 105-4 via which management controller 102 may obtain crash data through I3C link 160. Secondary PECIs 105-1 to 105-4 may be PECI protocol state machines arranged to support a few PECI commands compared to those implemented by primary PECI 111 located with CPU 110. The few PECI commands supported by secondary PECIs 105-1 to 105-4 may include PECI commands from management controller 102 to facilitate providing of crash data to management controller 102. Management controller 102 may also submit these PECI commands to primary PECI 111. These PECI commands supported by secondary PECIs 105-1 to 105-4 as well as primary PECI 111 may include, but are not limited to, a "Get_Package_Identifier" that may identify a CD or CPU (either integrated or discrete), a "Get_Crash_Data" that may provide crash data for a given CD or CPU or a "Get_Telemetry_Data" that may provide telemetry information (e.g., write bandwidth, read bandwidth, diagnostic information, voltage, temperatures, etc.) for a given CD or CPU.

In some examples, I3C link 160 coupling management controller 102 to primary PECI 111 and secondary PECIs 105-1 to 105-4 may include multi-drop support 104. For these examples, multi-drop support 104 may enable primary PECI 111 or secondary PECIs 105-1 to 105-4 to serves as multiple slaves and management controller 102 to serve as a single master for I3C link 160. Primary PECI 111 or secondary PECIs 105-1 to 105-4 may separately sense or listen for data anticipated to be received through respective PECI I/Fs 165-2 to 165-6 coupled with I3C link 160. For example, the data may be associated with PECI commands such as Get_Package_Identifier, Get_Crash_Data or Get_Telemetry_Data. Multi-drop support 104 utilized by PECI 111 or secondary PECIs 105-1 to 105-4 for I3C link 160 may be according to the I3C specification.

In some examples, system 100 may be hosted by one or more host computing platforms or systems that may include, but are not limited to, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof.

In some examples, CPU 110 may represent, either individually or collectively, various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon® or Xeon Phi® processors; and similar processors.

Figure 2:
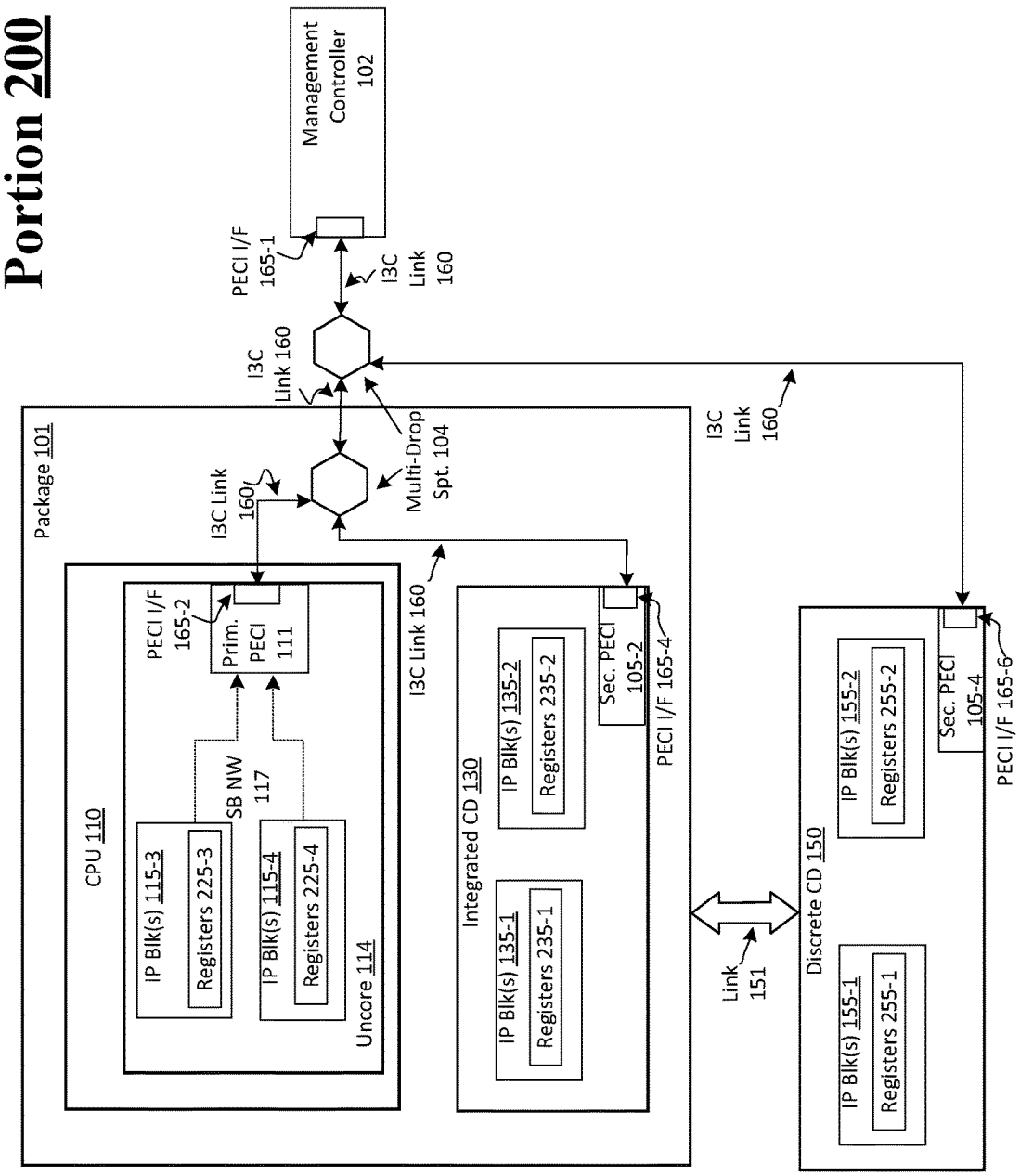
FIG. 2 illustrate an example portion of the system.

FIG. 2 illustrates an example portion 200. In some examples, as shown in FIG. 2, portion 200 includes a portion of system 100 that includes management controller 102, package 101 and discrete CD 150. For these examples, similar to what is shown in FIG. 1, management controller 102 may couple with primary PECI 111 at CPU 110, secondary PECI 105-2 at integrated CD 130 and PECI 105-4 at secondary PECI 105-4 via I3C link 160.

According to some examples, as shown in FIG. 2 for portion 200, IP blk(s) 115-3 and 115-4 at CPU 110 may have respective registers 225-3 and 225-4 to at least temporarily maintain crash information or data associated with a catastrophic error experienced by IP blk(s) 115-3 and 115-4 before or following the catastrophic error. Also, IP blk(s) 135-1 and 135-2 at integrated CD 130 may have respective registers 235-1 and 235-2 to at least temporarily maintain crash information or data associated with a catastrophic error experienced by IP blk(s) 135-1 and 135-2 before or following the catastrophic error. Also, IP blk(s) 155-1 and 155-2 at discrete CD 150 may have respective registers 255-1 and 255-2 to at least temporarily maintain crash information or data associated with a catastrophic error experienced by IP blk(s) 155-1 and 155-2 before or following the catastrophic error. Types of catastrophic errors may include, but are not limited to, a three-strike timeout. For these examples, registers 225-3, 225-4, 235-1, 235-2, 255-1 or 255-2 may be sticky registers arranged to preserve stored information or data following warm resets of system 100 to enable primary PECI 111, secondary PECI 105-2 or secondary PECI 105-4 to provide error information included in the crash information or data to management controller 102 responsive to receiving PECI commands from management controller 102. In other words, registers 225-3, 225-4, 235-1, 235-2, 255-1 or 255-2 do not revert or reset to default values following a warm reset to allow primary PECI 111, secondary PECI 105-2 or secondary PECI 105-4 to retrieve error information from these registers after the warm reset.

In some examples, registers 225-3, 225-4, 235-1, 235-2, 255-1 or 255-2 may include persistent types of memory such as types of non-volatile memory and/or types of battery backed volatile memory. The types of non-volatile memory may include byte or block addressable types of non-volatile memory having a 3-dimensional (3-D) cross-point memory structure that includes chalcogenide phase change material or other types of resistive memory material hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), anti-ferroelectric memory, resistive memory including the metal oxide base, the oxygen vacancy base and the conductive bridge Random Access Memory (CB-RAM), a spintronic magnetic junction memory, a magnetic tunneling junction (MTJ) memory, a Domain Wall (DW) and Spin Orbit Transfer (SOT) memory, a thiristor based memory, a magnetoresistive random access memory (MRAM) that incorporates memristor technology, spin transfer torque MRAM (STT-MRAM), or a combination of any of the above. Battery backed volatile memory may include types of volatile memory such as, but not limited to, dynamic random access memory (DRAM).

Figure 3:
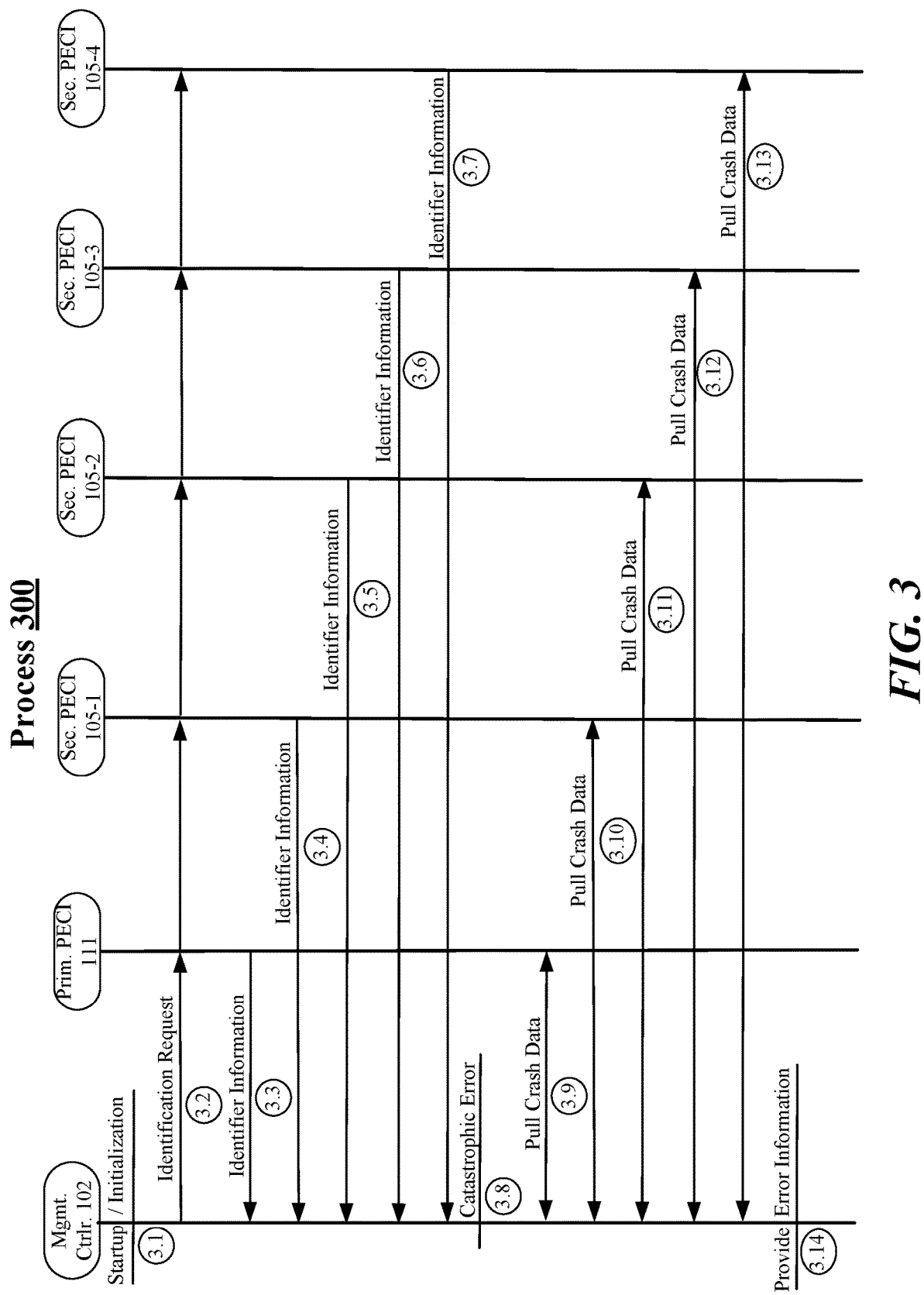
FIG. 3 illustrates an example first process.

FIG. 3 illustrates an example process 300. In some examples, process 300 may be an example process of how logic and/or features of a management controller, a primary PECI or one or more secondary PECIs facilitate retrieval of error information gathered before and/or subsequent to a catastrophic error of a computing system. For these examples, elements of system 100 as shown in FIGS. 1 and 2 may be related to process 300. These elements of system 100 may include, but are not limited to, management controller 102, primary PECI 111 or secondary PECIs 105-1 to 105-4.

Beginning at process 3.1, logic and/or features of management controller 102 may detect a startup or initialization of system 100. In some examples, the startup or initialization may include at least the startup or initialization of components of package 101 and the startup or initialization of components of discrete CDs 140 and 150.

Moving to process 3.2, the logic and/or features of management controller 102 may sense or detect a presence of primary PECI 111 and secondary PECIs 105-1 to 105-4 coupled with I3C link 160 following the startup or initialization of components of package 101 and the startup or initialization of components of discrete CDs 140 and 150. In some examples, the logic and/or features of management controller 102 may send an identification request to PECI 111 and secondary PECIs 105-1 to 105-4 through PECI I/F 165-1 coupled with I3C link 160. For these examples, the identification request may be included in a PECI command such as a Get_Package_Identifier PECI command.

Moving to process 3.3, logic and/or features at primary PECI 111 may send identifier information to management controller 102 responsive to receiving an identification request via I3C link 160. According to some examples, the identifier information may include separate identifiers for IP blk(s) 115-1 to 115-4. The identifier information may also include an identifier for primary PECI 111 and/or CPU 110 so that management controller 102 may uniquely identify primary PECI 111 and/or CPU 110. The identifier information may be sent to management controller 102 through PECI I/F 165-2 coupled with I3C link 160.

Moving to process 3.4, logic and/or features at secondary PECI 105-1 may send identifier information to management controller 102 responsive to receiving an identification request via I3C link 160. According to some examples, the identifier information may include separate identifiers for IP blk(s) 125-1 and 125-2. The identifier information may also include an identifier for secondary PECI 105-1 and/or integrated CD 120 so that management controller 102 may uniquely identify primary PECI 105-1 and/or integrated CD 120. The identifier information may be sent to management controller 102 through PECI I/F 165-3 coupled with I3C link 160.

Moving to process 3.5, logic and/or features at secondary PECI 105-2 may send identifier information to management controller 102 responsive to receiving an identification request via I3C link 160. According to some examples, the identifier information may include separate identifiers for IP blk(s) 135-1 and 135-2. The identifier information may also include an identifier for secondary PECI 105-2 and/or integrated CD 130 so that management controller 102 may uniquely identify secondary PECI 105-2 and/or integrated CD 130. The identifier information may be sent to management controller 102 through PECI I/F 165-4 coupled with I3C link 160.

Moving to process 3.6, logic and/or features at secondary PECI 105-3 may send identifier information to management controller 102 responsive to receiving an identification request via I3C link 160. According to some examples, the identifier information may include separate identifiers for IP blk(s) 145-1 and 145-2. The identifier information may also include an identifier for secondary PECI 105-3 and/or discrete CD 140 so that management controller 102 may uniquely identify secondary PECI 105-3 and/or discrete CD 140. The identifier information may be sent to management controller 102 through PECI I/F 165-5 coupled with I3C link 160.

Moving to process 3.7, logic and/or features at secondary PECI 105-4 may send identifier information to management controller 102 responsive to receiving an identification request via I3C link 160. According to some examples, the identifier information may include separate identifiers for IP blk(s) 155-1 and 155-2. The identifier information may also include an identifier for secondary PECI 105-4 and/or discrete CD 150 so that management controller 102 may uniquely identify secondary PECI 105-4 and/or discrete CD 150. The identifier information may be sent to management controller 102 through PECI I/F 165-6 coupled with I3C link 160.

Moving to process 3.8, logic and/or features of management controller 102 may detect or sense that a catastrophic error has occurred in system 100. In some examples, a three-strike timeout catastrophic error may be signaled by components of package 101 such as CPU 110 via a CATERR/IERR signal. For these examples, IP blocks located at uncore 114, integrated CDs 120/130 and discrete CDs 140/150 may store error information in their respective registers to indicate state information of these IP blocks at the time of the three-strike timeout catastrophic error responsive to the CATERR/IERR signal.

Moving to process 3.9, logic and/or features of management controller 102 may send a PECI command through PECI I/F 165-1 coupled with I3C link 160 to cause primary PECI 111 to pull crash data from registers for IP blk(s) 115-1 to 115-4. The command may also cause primary PECI 111 to send the crash data to management controller 102 through PECI I/F 165-2 coupled with I3C link 160. In some examples, the PECI command may include a Get_Crash_Data PECI command that contains the identifier information provided by primary PECI 111 at process 3.3. The logic and/or features of primary PECI 111 may monitor I3C link 160 and respond to the Get_Crash_Data PECI command based on the command including its identifier information. The response may include obtaining error information from registers for IP blk(s) 115-1 to 115-4 and then sending the error information along with what IP blk(s) generated particular portions of the error information as part of the pulled crash data.

Moving to process 3.10, logic and/or features of management controller 102 may send a PECI command through PECI I/F 165-1 coupled with I3C link 160 to cause secondary PECI 105-1 at integrated CD 120 to pull crash data from registers for IP blk(s) 125-1 and 125-2. The command may also cause secondary PECI 105-1 to send the crash data to management controller 102 through PECI I/F 165-3 coupled with I3C link 160. In some examples, the PECI command may include a Get_Crash_Data PECI command that contains the identifier information provided by secondary PECI 105-1 at process 3.4. The logic and/or features of secondary PECI 105-1 may monitor I3C link 160 and respond to the Get_Crash_Data PECI command based on the command including its identifier information. The response may include obtaining error information from registers for IP blk(s) 125-1 and 125-2 and then sending the error information along with what IP blk(s) generated particular portions of the error information as part of the pulled crash data.

Moving to process 3.11, logic and/or features of management controller 102 may send a PECI command through PECI I/F 165-1 coupled with I3C link 160 to cause secondary PECI 105-2 at integrated CD 130 to pull crash data from registers for IP blk(s) 135-1 and 135-2. The command may also cause secondary PECI 105-2 to send the crash data to management controller 102 through PECI I/F 165-4 coupled with I3C link 160. In some examples, the PECI command may include a Get_Crash_Data PECI command that contains the identifier information provided by secondary PECI 105-2 at process 3.5. The logic and/or features of secondary PECI 105-2 may monitor I3C link 160 and respond to the Get_Crash_Data PECI command based on the command including its identifier information. The response may include obtaining error information from registers for IP blk(s) 135-1 and 135-2 and then sending the error information along with what IP blk(s) generated particular portions of the error information as part of the pulled crash data.

Moving to process 3.12, logic and/or features of management controller 102 may send a PECI command through PECI I/F 165-1 coupled with I3C link 160 to cause secondary PECI 105-3 at discrete CD 140 to pull crash data from registers for IP blk(s) 145-1 and 145-2. The command may also cause secondary PECI 105-3 to send the crash data to management controller 102 through PECI I/F 165-5 coupled with I3C link 160. In some examples, the PECI command may include a Get_Crash_Data PECI command that contains the identifier information provided by secondary PECI 105-3 at process 3.6. The logic and/or features of secondary PECI 105-3 may monitor I3C link 160 and respond to the Get_Crash_Data PECI command based on the command including its identifier information. The response may include obtaining error information from registers for IP blk(s) 145-1 and 145-2 and then sending the error information along with what IP blk(s) generated particular portions of the error information as part of the pulled crash data.

Moving to process 3.13, logic and/or features of management controller 102 may send a PECI command through PECI I/F 165-1 coupled with I3C link 160 to cause secondary PECI 105-4 at discrete CD 150 to pull crash data from registers for IP blk(s) 155-1 and 155-2. The command may also cause secondary PECI 105-4 to send the crash data to management controller 102 through PECI I/F 165-6 coupled with I3C link 160. In some examples, the PECI command may include a Get_Crash_Data PECI command that contains the identifier information provided by secondary PECI 105-4 at process 3.7. The logic and/or features of secondary PECI 105-4 may monitor I3C link 160 and respond to the Get_Crash_Data PECI command based on the command including its identifier information. The response may include obtaining error information from registers for IP blk(s) 155-1 and 155-2 and then sending the error information along with what IP blk(s) generated particular portions of the error information as part of the pulled crash data Moving to process 3.14, logic and/or features of management controller 102 may provide the gathered error information included in the pulled crash data for debugging purposes. In some examples, the gathered error information may be provided to an operator of a computing platform or system that includes system 100, e.g., displayed on a user interface or provided in a data file. In some examples, the gathered error information may be provided to a higher level management entity such as a datacenter management entity for debugging purposes on a larger scale that may include debugging of multiple computing platforms or systems each having a system similar to system 100. Process 300 may then come to an end.

Figure 4:
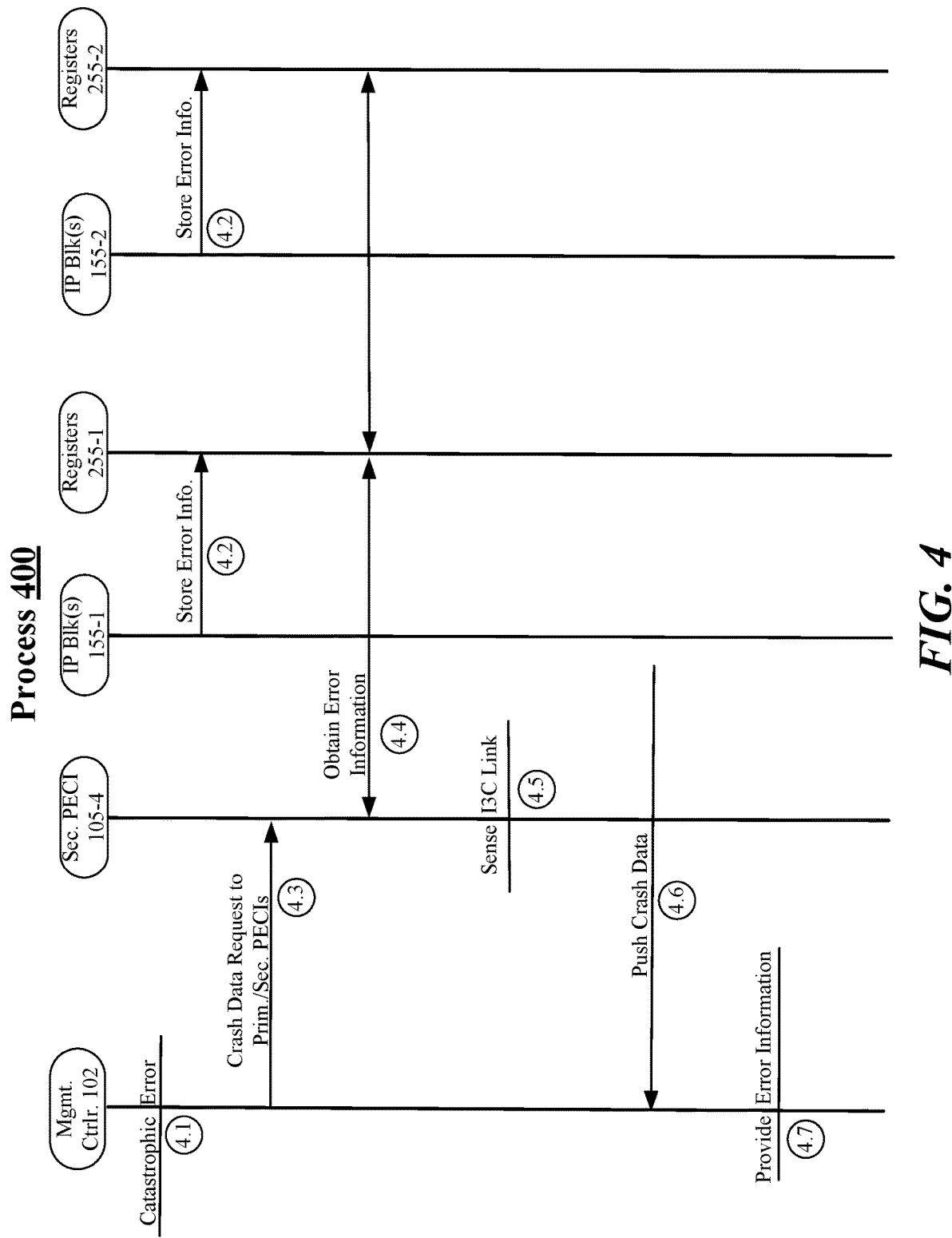
FIG. 4 illustrates an example second process.

FIG. 4 illustrates an example process 400. According to some examples, process 400 may be an example process of how logic and/or features at a management controller or primary/secondary PECI facilitate retrieval of error information gathered before and/or subsequent to a catastrophic error of a system and at least temporarily stored in specific registers. For these examples, elements of system 100 as shown in FIGS. 1 and 2 may be related to process 400. These elements of system 100 may include, but are not limited to, management controller 102, discrete CD 150, secondary PECI 105-4, IP blk(s)155-1/155-2 or registers 255-1/255-2. Also, for process 400 it is assumed that management controller has already obtained identifier information from secondary PECI 105-4 as mentioned previously in process 300.

Beginning at process 4.1, logic and/or features of management controller 102 may detect or sense that a catastrophic error has occurred in system 100. In some examples, a three-strike timeout catastrophic error may be signaled by components of package 101 such as CPU 110 via a CATERR/IERR signal.

Moving to process 4.2, IP blk(s) 155-1 and IP blk(s) 155-2 may cause error information indicating respective state information at the time of the three-strike timeout catastrophic error to be stored to respective registers 255-1 and 255-2. In some examples, IP blk(s) 155-1 and IP blk(s) 155-2 may cause the error information to be stored to respective registers 255-1 and 255-2 responsive to the CATERR/IERR signal or other type of signal that may indicate occurrence of a catastrophic error (e.g., received via link 151).

Moving to process 4.3, logic and/or features of management controller 102 may send a PECI command through PECI I/F 165-1 coupled with I3C link 160 to primary and secondary PECIs. In some examples, the PECI command may include a Get_Crash_Data PECI command that does not contain identifier information. In other words, the Get_Crash_Data PECI command may be broadcast to primary and secondary PECIs coupled with management controller 102 through PECI I/F 165-1 coupled with I3C link 160.

Moving to process 4.4, logic and/or features of secondary PECI 105-4 may receive the Get_Crash_Data PECI command and responsive to the Get_Crash_Data PECI command the logic and/or features may obtain or pull error information from both registers 255-1 and 255-2.

Moving to process 4.5, logic and/or features of secondary PECI 105-4 may sense I3C link 160 to determine if other PECIs are currently sending or receiving data to/from management controller 102 via I3C link 160.

Moving to process 4.6, if the logic and/or features of secondary PECI 105-4 sense no other access to I3C link 160, crash data including the error information pulled from registers 255-1 and 255-2 may be sent or pushed to management controller 102 through PECI I/F 165-6 coupled with I3C link 160. For these examples, identifier information may be included with the crash data to indicate to management controller 102 that second PECI 105-4 is the source of the crash data. The crash data may also indicate what IP blk(s) from among IP blk(s) 155-1 and 155-2 generated particular portions of the error information included in the crash data.

Moving to process 4.7, logic and/or features of management controller 102 may provide the error information included in the crash data received from secondary PECI 105-4 for use in debugging system 100. In some examples, the error information may be gathered with other error information provided by other secondary or primary PECIs and then provided to an operator of a computing platform or system that includes system 100, e.g., displayed on a user interface or provided in a data file. In some examples, gathered error information may be provided to a higher level management entity such as a datacenter management entity for debugging purposes on a larger scale that may include debugging of multiple computing platforms or systems. Process 400 may then come to an end.

According to some examples, a similar process may be implemented by logic and/or features of management controller 102 or of primary/secondary PECIs 155/105-1 to 105-4 to gather telemetry data. For these examples, management controller 102 may periodically send or broadcast a Get_Telemetry_Data PECI command that does not contain identifier information. Logic and/or features of primary/secondary PECIs 155/105-1 to 105-4 may receive the generic Get_Telemetry_Data PECI command and then obtain telemetry data that may be stored at registers or other data storage structures arranged to maintain telemetry data. Logic and/or features of primary/secondary PECIs 155/105-1 to 105-4 may then sense I3C link 160 to determine if other PECIs are currently sending or receiving data to/from management controller 102 via I3C link 160 and then send their respectively gathered telemetry data with identifier information if I3C link 160 is not in use.

In some examples, management controller 102 may periodically send or broadcast a Get_Telemetry_Data PECI command that contains specific identifier information. For these examples, the primary/secondary PECI that matches the specific identifier information responds to the request for telemetry data and provides the telemetry data to management controller 102 via I3C link 160. Thus, for these examples, telemetry data is pulled separately from primary/secondary PECIs as compared to a generic Get_Telemetry_Data PECI command that may cause primary/secondary PECIs to push telemetry data to management controller 102.

According to some examples, gathered telemetry data may be used by logic and/or features of management controller 102 to determine a probability of a catastrophic error based on entering gathered telemetry data in one or more operating algorithms designed to provide an early warning of a catastrophic error. An early warning of a catastrophic error may result in causing IP blocks to store state information to their respective registers before the catastrophic error hits and possibly disrupts or prevents IP blocks from storing at least some error information. For example, telemetry information such as a voltage or temperature spike at an integrated or a discrete CD may indicate a possible catastrophic error is about to occur. Management controller 102 may cause IP blocks at the integrated CD, the discrete CD or the entire system to store error information if operating algorithms indicate a raised probability of a catastrophic error based on the voltage or temperature spike. Examples, are not limited to voltage or temperature telemetry data for use to determine a probability of a catastrophic error.

Figure 5:
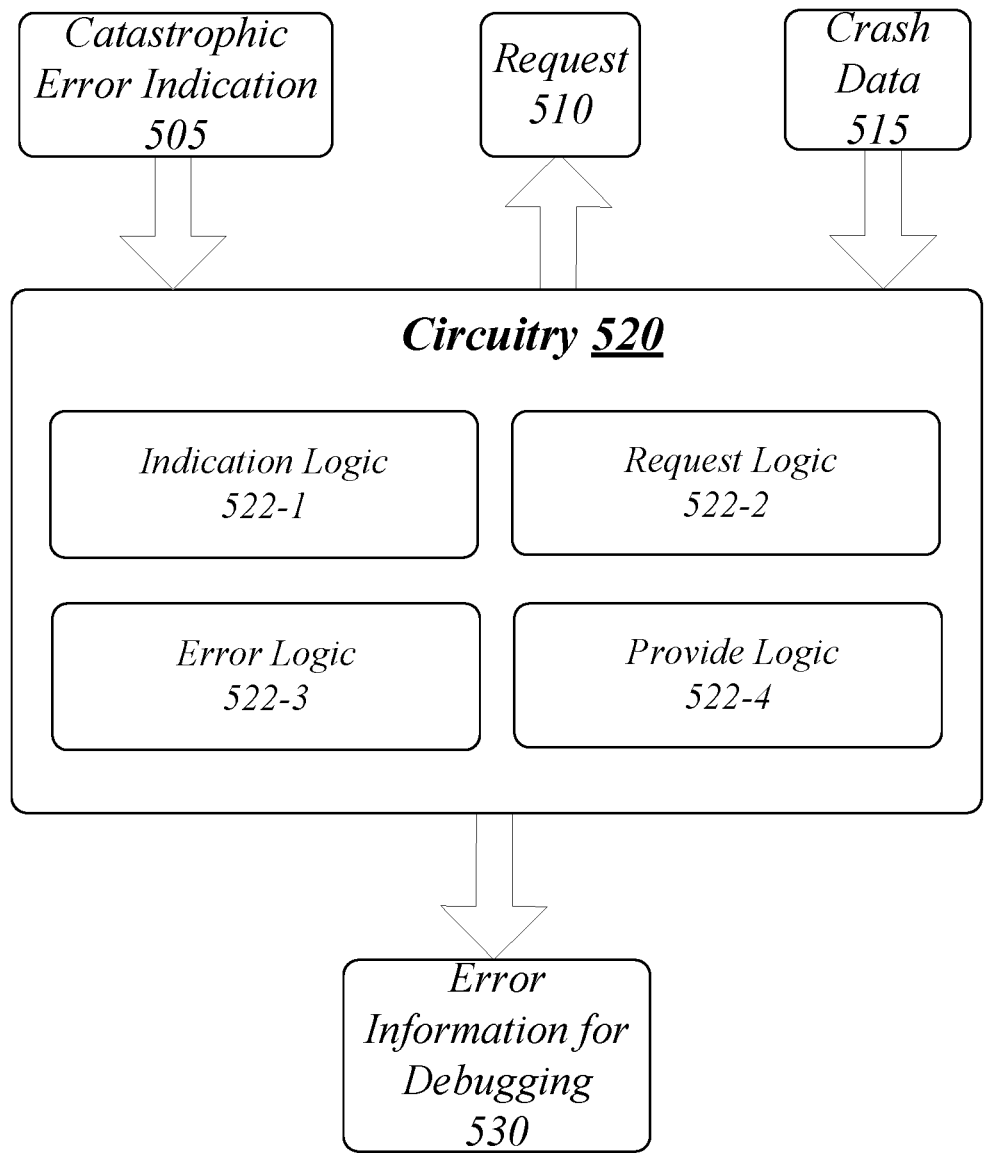
FIG. 5 illustrates an example block diagram for a first apparatus.

FIG. 5 illustrates an example block diagram for apparatus 500. Although apparatus 500 shown in FIG. 5 has a limited number of elements in a certain topology, it may be appreciated that the apparatus 500 may include more or less elements in alternate topologies as desired for a given implementation.

According to some examples, apparatus 500 may be supported by circuitry 520. For these examples, circuitry 520 may include a processor circuit of a management controller for a computing system, e.g., management controller 102 as shown in FIG. 1 or 2. Circuitry 520 may be arranged to execute one or more software or firmware implemented modules, components or logic 522-a (module, component or logic may be used interchangeably in this context). In other examples, circuitry 520 may be arranged to implement modules, components or logic 522-a that may be wholly or at least partially implemented in hardware (module, component or logic may also be used interchangeably in this context). It is worthy to note that "a" and "b" and "c" and similar designators as used herein are intended to be variables representing any positive integer. Thus, for example, if an implementation sets a value for a=4, then a complete set of modules, components or logic 522-a may include logic 522-1, 522-2, 522-3 or 522-4. The examples presented are not limited in this context and the different variables used throughout may represent the same or different integer values. Also, "logic", "module" or "component" may also include software/firmware stored in computer-readable media, and although types of logic are shown in FIG. 5 as discrete boxes, this does not limit these types of logic to storage in distinct computer-readable media (e.g., a separate memory, etc.).

According to some examples, as mentioned above, circuitry 520 may include a processor circuit of a management controller. Circuitry 520 may be generally arranged to execute or implement one or more components, modules or logic 522-a. Circuitry 520 may be all or at least a part of any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples, circuitry 520 may be configured as an application specific integrated circuit (ASIC) and at least some components, modules or logic 522-a may be implemented as hardware elements of the ASIC. According to some examples, circuitry 520 may be configured as a field programmable gate array (FPGA) and at least some components, modules or logic 522-a may be implemented as hardware elements of the FPGA.

According to some examples, apparatus 500 may include an indication logic 522-1. Indication logic 522-1 may be executed or implemented by circuitry 520 to receive an indication of a catastrophic error for a computing system that includes a CPU coupled with one or more companion dice. For these examples, catastrophic error indication 505 may include the indication of catastrophic error.

In some examples, apparatus 500 may include a request logic 522-2. Request logic 522-2 may be executed or implemented by circuitry 520 to send a request to gather error information from the CPU and from the one or more companion dice responsive to the indication of the catastrophic error, the request sent through an interface coupled with a communication link, the communication link separately coupled to the CPU and separately coupled to each of the one or more companion dice. For these examples, the request to gather error information may be included in request 510.

According to some examples, apparatus 500 may also include an error logic 522-3. Error logic 522-3 may be executed or implemented by circuitry 520 to separately receive error information from the CPU and from each of the one or more companion dice through the interface coupled with the communication link. For these examples, the separately received error information may be included in crash data 515.

In some examples, apparatus 500 may also include a provide logic 522-4. Provide logic 522-4 may be executed or implemented by circuitry 520 to provide the received error information for debugging the computer system to recover from the catastrophic error. For these examples, error information for debugging 530 may include the provided error information. Although not shown in FIG. 5, in some examples, apparatus 500 may include a digital display coupled with circuitry 520 to present a user interface view to provide the error information for debugging. In other examples, a data file report may be provided including the error information and via which a user or higher level management entity may use for debugging.

Various components, modules or logic of apparatus 500 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 6 illustrates an example logic flow 600. Logic flow 600 may be representative of some or all of the operations executed by one or more logic, features, or devices described herein, such as apparatus 500. More particularly, logic flow 600 may be implemented by at least indication logic 522-1, request logic 522-2 or error logic 522-3.

According to some examples, logic flow 600 at block 602 may receive, at a management controller, an indication of a catastrophic error for a computing system that includes a CPU coupled with one or more companion dice. For these examples, indication logic 522-1 may receive the indication.

In some examples, logic flow 600 at block 604 may send a request to gather error information from the CPU and from the one or more companion dice responsive to the indication of the catastrophic error, the request sent via a communication link coupled to the management controller and separately coupled to the CPU and separately coupled to each of the one or more companion dice. For these examples, request logic 522-2 may send the request.

According to some examples, logic flow 600 at block 606 may separately receive error information from the CPU and from each of the one or more companion dice via the communication link. For these examples, error logic 522-3 may receive the error information.

FIG. 7 illustrates an example storage medium 700. As shown in FIG. 7, the first storage medium includes a storage medium 700. The storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
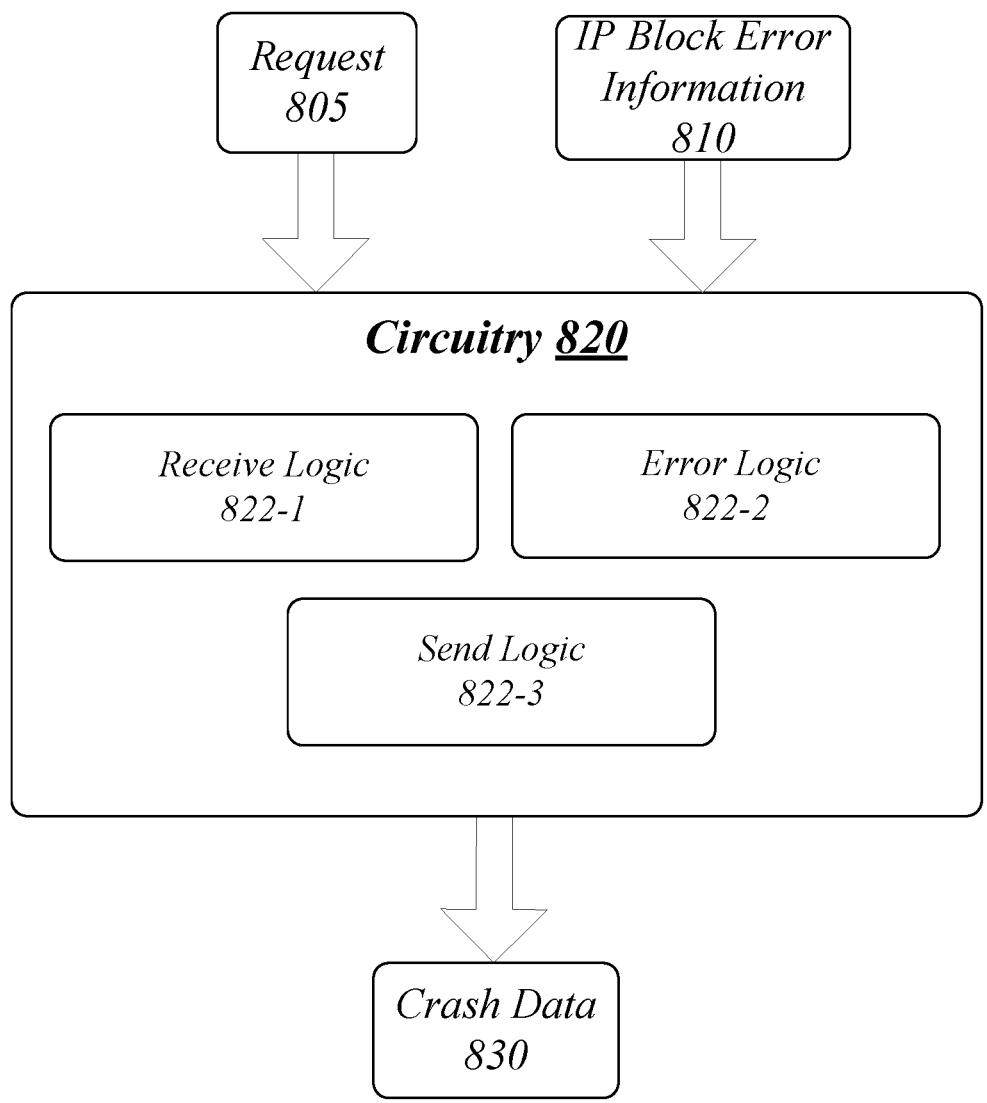
FIG. 8 illustrates an example block diagram for a second apparatus.

FIG. 8 illustrates an example block diagram for apparatus 800. Although apparatus 800 shown in FIG. 8 has a limited number of elements in a certain topology, it may be appreciated that the apparatus 800 may include more or less elements in alternate topologies as desired for a given implementation.

According to some examples, apparatus 800 may be supported by circuitry 820. For these examples, circuitry 820 may include a processor circuit or processor circuitry for a state machine included at a CPU or companion dice coupled with the CPU, e.g., part of primary PECI 111 or secondary PECIs 105-1 to 105-4 as shown in FIG. 1 or 2. Circuitry 820 may be arranged to execute one or more software or firmware implemented modules, components or logic 822-*a* (module, component or logic may be used interchangeably in this context). In other examples, circuitry 820 may be arranged to implement modules, components or logic 822-*a* that may be wholly or at least partially implemented in hardware (module, component or logic may also be used interchangeably in this context). It is worthy to note that "a" and "b" and "c" and similar designators as used herein are intended to be variables representing any positive integer. Thus, for example, if an implementation sets a value for a=3, then a complete set of modules, components or logic 822-*a* may include logic 822-1, 822-2 or 822-3. The examples presented are not limited in this context and the different variables used throughout may represent the same or different integer values. Also, "logic", "module" or "component" may also include software/firmware stored in computer-readable media, and although types of logic are shown in FIG. 8 as discrete boxes, this does not limit these types of logic to storage in distinct computer-readable media (e.g., a separate memory, etc.).

According to some examples, as mentioned above, circuitry 820 may include a processor circuit or processor circuitry. Circuitry 820 may be generally arranged to execute or implement one or more components, modules or logic 822-*a*. Circuitry 820 may be all or at least a part of any of various commercially available processors, such as, but not limited to those mentioned above for circuitry 520 of apparatus 500. According to some examples circuitry 820 may be configured as an application specific integrated circuit (ASIC) and at least some components, modules or logic 822-*a* may be implemented as hardware elements of the ASIC. According to some examples, circuitry 820 may be configured as a field programmable gate array (FPGA) and at least some components, modules or logic 822-*a* may be implemented as hardware elements of the FPGA.

According to some examples, apparatus 800 may include a receive logic 822-1. Receive logic 822-1 may be executed or implemented by circuitry 820 to receive a request to gather error information generated by one or more IP blocks responsive to a catastrophic error for a computing system. For these examples, the request may be received through an interface coupled with the communication link. The communication link coupled to a management controller for the computing system that includes a CPU coupled with one or more companion dice. The received request may be included in request 805.

In some examples, apparatus 800 may include an error logic 822-2. Error logic 822-2 may be executed or implemented by circuitry 820 to obtain the error information generated by the one or more IP blocks. For these examples, the error information may be obtained from IP block error information 810.

According to some examples, apparatus 800 may also include a send logic 822-3. Send logic 822-3 may be executed or implemented by circuitry 820 to send the error information generated by the one or more IP blocks to the management controller through the interface coupled with the communication link. For these examples, crash data 830 may include the error information sent to the management controller.

Similar to what was mentioned previously, various components, modules or logic of apparatus 800 may be communicatively coupled to each other by various types of communications media to coordinate operations.

FIG. 9 illustrates an example logic flow 900. Logic flow 900 may be representative of some or all of the operations executed by one or more logic, features, or devices described herein, such as apparatus 800. More particularly, logic flow 900 may be implemented by at least receive logic 822-1, error logic 822-2 or send logic 822-3.

According to some examples, logic flow 900 at block 902 may receive, at a state machine, a request to gather error information generated by one or more IP blocks responsive to a catastrophic error for a computing system including a CPU coupled with one or more companion dice, the request received via a communication link coupled with a management controller for the computing system. For these examples, receive logic 822-1 may receive the request.

In some examples, logic flow 900 at block 904 may obtain the error information generated by the one or more IP blocks. For these examples, error logic 822-2 may obtain the error information.

According to some examples, logic flow 900 at block 906 may send the error information generated by the one or more IP blocks to the management controller via the communication link. For these examples, send logic 822-3 may send the error information.

FIG. 10 illustrates an example storage medium 1000. As shown in FIG. 10, the first storage medium includes a storage medium 1000. The storage medium 1000 may comprise an article of manufacture. In some examples, storage medium 1000 may include any non-transitory computer readable medium or machine readable medium, such as an optical, magnetic or semiconductor storage. Storage medium 1000 may store various types of computer executable instructions, such as instructions to implement logic flow 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
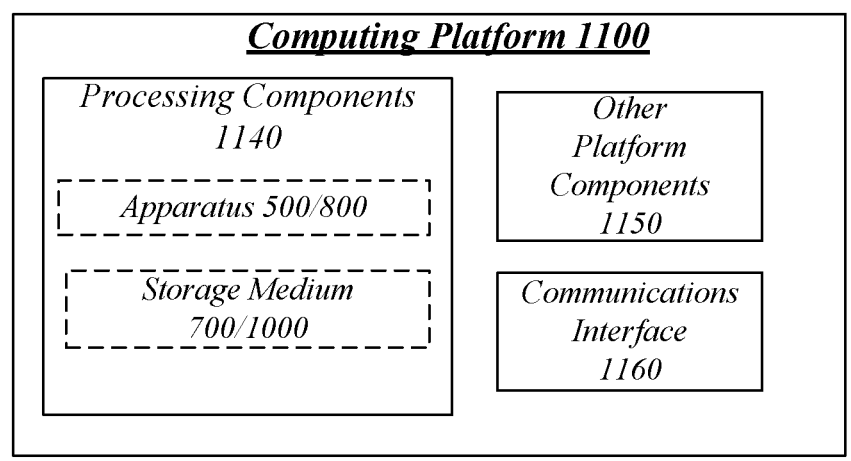
FIG. 11 illustrates an example block diagram for a computing platform.

FIG. 11 illustrates an example computing platform 1100. In some examples, as shown in FIG. 11, computing platform 1100 may include a processing components 1140, other platform components 1150 or a communications interface 1160.

According to some examples, processing components 1140 may execute or implement processing operations or logic for apparatus 500/800 and/or storage medium 700/1000. Processing components 1140 may include various hardware elements, software elements, or a combination of both. Examples of hardware elements may include devices, logic devices, components, processors, microprocessors, management controllers, companion dice, circuits, processor circuits, circuit elements (e.g., transistors, resistors, capacitors, inductors, and so forth), integrated circuits, ASICs, programmable logic devices (PLDs), digital signal processors (DSPs), FPGAs, memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (APIs), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1150 may include common computing elements, memory units, chipsets, controllers, peripherals, interfaces, oscillators, timing devices, video cards, audio cards, multimedia input/output (I/O) components (e.g., digital displays), power supplies, and so forth. Examples of memory units or memory devices may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1160 may include logic and/or features to support a communication interface. For these examples, communications interface 1160 may include one or more communication interfaces that operate according to various communication protocols or standards to communicate over direct or network communication links. Direct communications may occur via use of communication protocols or standards described in one or more industry standards (including progenies and variants) such as those associated with the PCIe specification or the I3C specification. Network communications may occur via use of communication protocols or standards such those described in one or more Ethernet standards promulgated by the Institute of Electrical and Electronics Engineers (IEEE). For example, one such Ethernet standard promulgated by IEEE may include, but is not limited to, IEEE 802.3-2012, Carrier sense Multiple access with Collision Detection (CSMA/CD) Access Method and Physical Layer Specifications, Published in December 2012 (hereinafter "IEEE 802.3 specification"). Network communication may also occur according to one or more OpenFlow specifications such as the OpenFlow Hardware Abstraction API Specification. Network communications may also occur according to one or more Infiniband Architecture specifications.

Computing platform 1100 may be implemented in a server or client computing device. Accordingly, functions and/or specific configurations of computing platform 1100 described herein, may be included or omitted in various embodiments of computing platform 1100, as suitably desired for a server or client computing device.

The components and features of computing platform 1100 may be implemented using any combination of discrete circuitry, ASICs, logic gates and/or single chip architectures. Further, the features of computing platform 1100 may be implemented using microcontrollers, FPGAs and/or microprocessors or any combination of the foregoing where suitably appropriate. It is noted that hardware, firmware and/or software elements may be collectively or individually referred to herein as "logic" or "circuit."

It should be appreciated that the exemplary computing platform 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" and may be similar to IP blocks. IP cores may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled" or "coupled with", however, may also mean that two or more elements are not in direct contact with each other, but yet still co-operate or interact with each other.

The follow examples pertain to additional examples of technologies disclosed herein.

EXAMPLE 1

An example apparatus may include an interface coupled with a communication link and circuitry to execute or implement logic. The logic may receive an indication of a catastrophic error for a computing system that includes a CPU coupled with one or more companion dice. The logic may also send a request to gather error information from the CPU and from the one or more companion dice responsive to the indication of the catastrophic error, the request sent through the interface coupled with the communication link. For this example, the communication link may be separately coupled to the CPU and separately coupled to each of the one or more companion dice. The logic may also separately receive error information from the CPU and from each of the one or more companion dice through the interface coupled with the communication link.

EXAMPLE 2

The apparatus of example 1 may also include the logic to provide the received error information for debugging the computing system to recover from the catastrophic error.

EXAMPLE 3

The apparatus of example 2 may also include a digital display coupled with the circuitry to present a user interface view to provide the received error information for debugging.

EXAMPLE 4

The apparatus of example 1, the catastrophic error may include a three-strike timeout indicated by a CATERR/IERR signal.

EXAMPLE 5

The apparatus of example 1, the error information may be gathered from one or more IP blocks at the CPU or one or more IP blocks at each of the one or more companion dice.

EXAMPLE 6

The apparatus of example 1, the one or more companion dice may be include an integrated companion die resident on a package via which the CPU also resides or include a discrete companion die resident on a first chip separate from a package via which the CPU resides.

EXAMPLE 7

The apparatus of example 1, the communication link may be a two-wire communication link. For this example, the two-wire communication link may be separately coupled to a first state machine at the CPU and separately coupled to at least a second state machine at the one or more companion dice.

EXAMPLE 8

The apparatus of example 7, the first state machine may be arranged as a primary PECI protocol state machine and the second state machine may be arranged as a secondary PECI protocol state machine.

EXAMPLE 9

The apparatus of example 8, the primary PECI protocol state machine may be included in an OOB-MSM and the apparatus may be arranged as a BMC.

EXAMPLE 10

The apparatus of example 7, the logic may send the request to gather error information through the interface coupled with the two-wire communication link according to one or more MIPI Alliance Sensor Working Group Specifications including the MIPI I3C specification, version 1.0.

EXAMPLE 11

The apparatus of example 10, the request may be included in a PECI command.

EXAMPLE 12

An example method may include receiving, at a management controller, an indication of a catastrophic error for a computing system that includes a CPU coupled with one or more companion dice. The method may also include sending a request to gather error information from the CPU and from the one or more companion dice responsive to the indication of the catastrophic error. For this example, the request may be sent via a communication link coupled to the management controller and separately coupled to the CPU and separately coupled to each of the one or more companion dice. The method may also include separately receiving error information from the CPU and from each of the one or more companion dice via the communication link.

EXAMPLE 13

The method of example 12 may also include providing the received error information for debugging the computing system to recover from the catastrophic error.

EXAMPLE 14

The method of example 12, the catastrophic error may be a three-strike timeout indicated by a CATERR/IERR signal.

EXAMPLE 15

The method of example 12, the error information may be gathered from one or more IP blocks at the CPU or one or more IP blocks at each of the one or more companion dice.

EXAMPLE 16

The method of example 12, the one or more companion dice may include an integrated companion die resident on a package via which the CPU also resides or may include a discrete companion die resident on a first chip separate from a package via which the CPU resides.

EXAMPLE 17

The method of example 12, the communication link may be a two-wire communication link. For this example, the two-wire communication link may be separately coupled to a first state machine at the CPU and may be separately coupled to at least a second state machine at the one or more companion dice.

EXAMPLE 18

The method of example 17, the first state machine may be arranged as a primary PECI protocol state machine and the second state machine may be arranged as a secondary PECI protocol state machine.

EXAMPLE 19

The method of example 18, the primary PECI protocol state machine may be included in an OOB-MSM and the management controller may be arranged as a BMC.

EXAMPLE 20

The method of example 17 may also include sending the request to gather error information via the two-wire communication link according to one or more MIPI Alliance Sensor Working Group Specifications including the MIPI I3C specification, version 1.0.

EXAMPLE 21

An example at least one machine readable medium may include a plurality of instructions that in response to being executed by a system may cause the system to carry out a method according to any one of examples 12 to 20.

EXAMPLE 22

An example apparatus may include means for performing the methods of any one of examples 12 to 20.

EXAMPLE 23

An example at least one machine readable medium may include a plurality of instructions that in response to being executed by a management controller may cause the management controller to receive an indication of a catastrophic error for a computing system that includes a CPU coupled with one or more companion dice. The instructions may also cause the management controller to send a request to gather error information from the CPU and from the one or more companion dice responsive to the indication of the catastrophic error, the request sent via a communication link coupled to the management controller and separately coupled to the CPU and separately coupled to each of the one or more companion dice. The instructions may also cause the management controller to separately receive error information from the CPU and from each of the one or more companion dice via the communication link.

EXAMPLE 24

The at least one machine readable medium of example 23, may also include the instructions to cause the management controller to provide the received error information for debugging the computing system to recover from the catastrophic error.

EXAMPLE 25

The at least one machine readable medium of example 23, the catastrophic error may be a three-strike timeout indicated by a CATERR/IERR signal.

EXAMPLE 26

The at least one machine readable medium of example 23, the error information may be gathered from one or more IP blocks at the CPU or one or more IP blocks at each of the one or more companion dice.

EXAMPLE 27

The at least one machine readable medium of example 23, the one or more companion dice may be an integrated companion die resident on a package via which the CPU also resides or may be a discrete companion die resident on a first chip separate from a package via which the CPU resides.

EXAMPLE 28

The at least one machine readable medium of example 23, the communication link may be a two-wire communication link. For this example, the two-wire communication link may be separately coupled to a first state machine at the CPU and may be separately coupled to at least a second state machine at the one or more companion dice.

EXAMPLE 29

The at least one machine readable medium of example 28, the first state machine may be arranged as a primary PECI protocol state machine and the second state machine may be arranged as a secondary PECI protocol state machine.

EXAMPLE 30

The at least one machine readable medium of example 29, the primary PECI protocol state machine may be included in an OOB-MSM and the management controller may be arranged as a BMC.

EXAMPLE 31

The at least one machine readable medium of example 28, the instructions may also cause the management controller to send the request to gather error information via the two-wire communication link according to one or more MIPI Alliance Sensor Working Group Specifications including the MIPI I3C specification, version 1.0.

EXAMPLE 32

An example apparatus may include an interface coupled with a communication link coupled to a management controller for a computing system including a CPU coupled with one or more companion dice. The apparatus may also include circuity to execute or implement logic. The logic may receive a request to gather error information generated by one or more IP blocks responsive to a catastrophic error for the computing system, the request received through the interface coupled with the communication link. The logic may also obtain the error information generated by the one or more IP blocks. The logic may also send the error information generated by the one or more IP blocks to the management controller through the interface coupled with the communication link.

EXAMPLE 33

The apparatus of example 32, the error information may be included in crash data that includes identifier information to identify one or more sources of the error information.

EXAMPLE 34

The apparatus of example 32, the logic may obtain the error information from one or more registers arranged to at least temporarily store error information generated by the one or more IP blocks responsive to the catastrophic error.

EXAMPLE 35

The apparatus of example 34, the one or more registers may be one or more sticky registers that maintain stored error information following a warm reset of the computing system.

EXAMPLE 36

The apparatus of example 32, the catastrophic error may be a three-strike timeout indicated by a CATERR/IERR signal generated by the CPU or the one or more companion dies.

EXAMPLE 37

The apparatus of example 32, the one or more companion dice may be an integrated companion die resident on a package via which the CPU also resides or include a discrete companion die resident on a first chip separate from a package via which the CPU resides.

EXAMPLE 38

The apparatus of example 37, the communication link may be a two-wire communication link, the circuitry to execute or implement the logic to function as a primary PECI protocol state machine.

EXAMPLE 39

The apparatus of example 38, the circuitry to execute or implement the logic may function as the primary PECI protocol state machine as part of an OOB-MSM and the management controller may be arranged as a BMC.

EXAMPLE 40

The apparatus of example 38, the primary PECI protocol state machine may receive the request to gather error information via the two-wire communication link according to one or more MIPI Alliance Sensor Working Group Specifications including the MIPI I3C specification, version 1.0.

EXAMPLE 41

The apparatus of example 37, the communication link may be a two-wire communication link, the circuitry to execute or implement the logic to function as a secondary PECI protocol state machine as part of a state machine located at one of the one or more companion dice.

EXAMPLE 42

The apparatus of example 41, the secondary PECI protocol state machine may receive the request to gather error information via the two-wire communication link according to one or more MIPI Alliance Sensor Working Group Specifications including the MIPI I3C specification, version 1.0.

EXAMPLE 43

An example method may include receiving, at a state machine, a request to gather error information generated by one or more IP blocks responsive to a catastrophic error for a computing system including a CPU coupled with one or more companion dice. For this example, the request may be received via a communication link coupled with a management controller for the computing system. The method may also include obtaining the error information generated by the one or more IP blocks sending the error information generated by the one or more IP blocks to the management controller via the communication link.

EXAMPLE 44

The method of example 43, the error information may be included in crash data that includes identifier information to identify one or more sources of the error information.

EXAMPLE 45

The method of example 43 may also include obtaining the error information from one or more registers arranged to at least temporarily store error information generated by the one or more IP blocks responsive to the catastrophic error.

EXAMPLE 46

The method of example 45, the one or more registers may be one or more sticky registers that maintain stored error information following a warm reset of the computing system.

EXAMPLE 47

The method of example 43, the catastrophic error may be a three-strike timeout indicated by a CATERR/IERR signal generated by the CPU or the one or more companion dies.

EXAMPLE 48

The method of example 43, the one or more companion dice may include an integrated companion die resident on a package via which the CPU also resides or may include a discrete companion die resident on a first chip separate from a package via which the CPU resides.

EXAMPLE 49

The method of example 48, the communication link may be a two-wire communication link, the state machine arranged as a primary PECI protocol state machine.

EXAMPLE 50

The method of example 49, the primary PECI protocol state machine may be included in an OOB-MSM and the management controller may be arranged as a BMC.

EXAMPLE 51

The method of example 49 may also include receiving the request to gather error information via the two-wire communication link according to one or more MIPI Alliance Sensor Working Group Specifications including the MIPI I3C specification, version 1.0.

EXAMPLE 52

The method of example 48, the communication link may be a two-wire communication link, the state machine arranged as a secondary PECI protocol state machine located at one of the one or more companion dice.

EXAMPLE 53

The method of example 52 may also include receiving the request to gather error information via the two-wire communication link according to one or more MIPI Alliance Sensor Working Group Specifications including the MIPI I3C specification, version 1.0.

EXAMPLE 54

An example at least one machine readable medium may include a plurality of instructions that in response to being executed by a system may cause the system to carry out a method according to any one of examples 43 to 53.

EXAMPLE 55

An example apparatus may include means for performing the methods of any one of examples 43 to 53.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
an interface to be coupled with a communication link; and
circuitry to:
receive an indication of a catastrophic error for a computing system that includes a central processing unit (CPU) coupled with one or more integrated companion dice resident on a package via which the CPU also resides wherein the catastrophic error is a three-strike timeout indicated by a CATER/IERR signal;
send a request to gather error information from the CPU and from the one or more integrated companion dice responsive to the indication of the catastrophic error, the request arranged to be sent through the interface to be coupled with the communication link, the communication link to separately be coupled to the CPU and to separately be coupled to each of the one or more integrated companion dice; and
separately receive error information from the CPU and from each of the one or more integrated companion dice through the interface to be coupled with the communication link.

2. The apparatus of claim 1, further comprising the circuitry to:
provide the received error information for debugging the computing system to recover from the catastrophic error.

3. The apparatus of claim 2, comprising a digital display coupled with the circuitry to present a user interface view to provide the received error information for debugging.

4. The apparatus of claim 1, comprising the error information gathered from one or more intellectual property (IP) blocks at the CPU or one or more IP blocks at each of the one or more integrated companion dice.

5. The apparatus of claim 1, the communication link comprising a two-wire communication link, the two-wire communication link separately coupled to a first state machine at the CPU and separately coupled to at least a second state machine at the one or more integrated companion dice, wherein the two-wire communication link is a multi-drop serial data bus with one clock wire.

6. The apparatus of claim 5, comprising the first state machine arranged as a primary platform environmental control interface (PECI) protocol state machine and the second state machine arranged as a secondary PECI protocol state machine.

7. The apparatus of claim 6, comprising the primary PECI protocol state machine included in an out-of-band multi-server manager (OOB-MSM) and the apparatus arranged as a baseboard management controller (BMC).

8. The apparatus of claim 5, comprising the circuitry to send the request to gather error information through the interface coupled with the two-wire communication link according to one or more Mobile Industry Processor Interface (MIPI) Alliance Sensor Working Group Specifications including the MIPI I3C specification, version 1.0.

9. The apparatus of claim 8, comprising the request included in a PECI command.

10. A method comprising:
receiving, via a first communication link, at a management controller, an indication of a catastrophic error for a computing system that includes a central processing unit (CPU) coupled with one or more integrated companion dice resident on a package via which the CPU also resides;
sending a request to gather error information from the CPU and from the one or more integrated companion dice responsive to the indication of the catastrophic error, the request sent via a second I3C communication link coupled to the management controller and separately coupled to the CPU and separately coupled to each of the one or more integrated companion dice; and
separately receiving error information from the CPU and from each of the one or more integrated companion dice via the second I3C communication link.

11. The method of claim 10, comprising:
providing the received error information for debugging the computing system to recover from the catastrophic error.

12. The method of claim 10, comprising the error information gathered from one or more intellectual property (IP) blocks at the CPU or one or more IP blocks at each of the one or more integrated companion dice.

13. The method of claim 10, the second I3C communication link comprising a two-wire communication link, the two-wire communication link separately coupled to a first state machine at the CPU and separately coupled to at least a second state machine at the one or more integrated companion dice, the first state machine arranged as a primary platform environmental control interface (PECI) protocol state machine and the second state machine arranged as a secondary PECI protocol state machine.

14. The method of claim 13, comprising the primary PECI protocol state machine included in an out-of-band multi-server manager (OOB-MSM) and the management controller arranged as a baseboard management controller (BMC).

15. The method of claim 13, comprising sending the request to gather error information via the two-wire communication link according to one or more Mobile Industry Processor Interface (MIPI) Alliance Sensor Working Group Specifications including the MIPI I3C specification, version 1.0.

16. An apparatus comprising:
an interface to be coupled with a communication link coupled to a management controller for a computing system including a central processing unit (CPU) coupled with one or more companion dice; and
circuitry to:
receive a request to gather error information generated by one or more intellectual property (IP) blocks responsive to a catastrophic error for the computing system, the request arranged to be received through the interface to be coupled with the communication link;
obtain the error information generated by the one or more IP blocks, from one or more registers arranged to at least temporarily store error information generated by the one or more IP blocks responsive to the catastrophic error, the one or more registers including one or more sticky registers that maintain stored error information following a warm reset of the computing system; and send the error information generated by the one or more IP blocks to the management controller through the interface to be coupled with the communication link.

17. The apparatus of claim 16, comprising the error information included in crash data that includes identifier information to identify one or more sources of the error information.

18. The apparatus of claim 16, the one or more companion dice include an integrated companion die resident on a package via which the CPU also resides or include a discrete companion die resident on a first chip separate from a package via which the CPU resides.

19. The apparatus of claim 18, the communication link comprising a two-wire communication link, the circuitry to function as a primary platform environmental control interface (PECI) protocol state machine, wherein the two-wire communication link is a multi-drop serial data bus with one clock wire.

20. The apparatus of claim 19, comprising the circuitry to function as the primary PECI protocol state machine as part of an out-of-band multi-server manager (OOB-MSM) and the management controller arranged as a baseboard management controller (BMC).

21. The apparatus of claim 19, comprising the primary PECI protocol state machine arranged to receive the request to gather error information via the two-wire communication link according to one or more Mobile Industry Processor Interface (MIPI) Alliance Sensor Working Group Specifications including the MIPI I3C specification, version 1.0.

22. The apparatus of claim 18, the communication link comprising a two-wire communication link, the circuitry to function as a secondary platform environmental control interface (PECI) protocol state machine as part of a state machine located at one of the one or more companion dice, wherein the two-wire communication link is a multi-drop serial data bus with one clock wire.

23. The apparatus of claim 22, comprising the secondary PECI protocol state machine arranged to receive the request to gather error information via the two-wire communication link according to one or more Mobile Industry Processor Interface (MIPI) Alliance Sensor Working Group Specifications including the MIPI I3C specification, version 1.0.

* * * * *